Sept. 10, 1929.  F. C. BRANDENBURG  1,727,333
SHOVEL HANDLE
Filed May 11, 1923
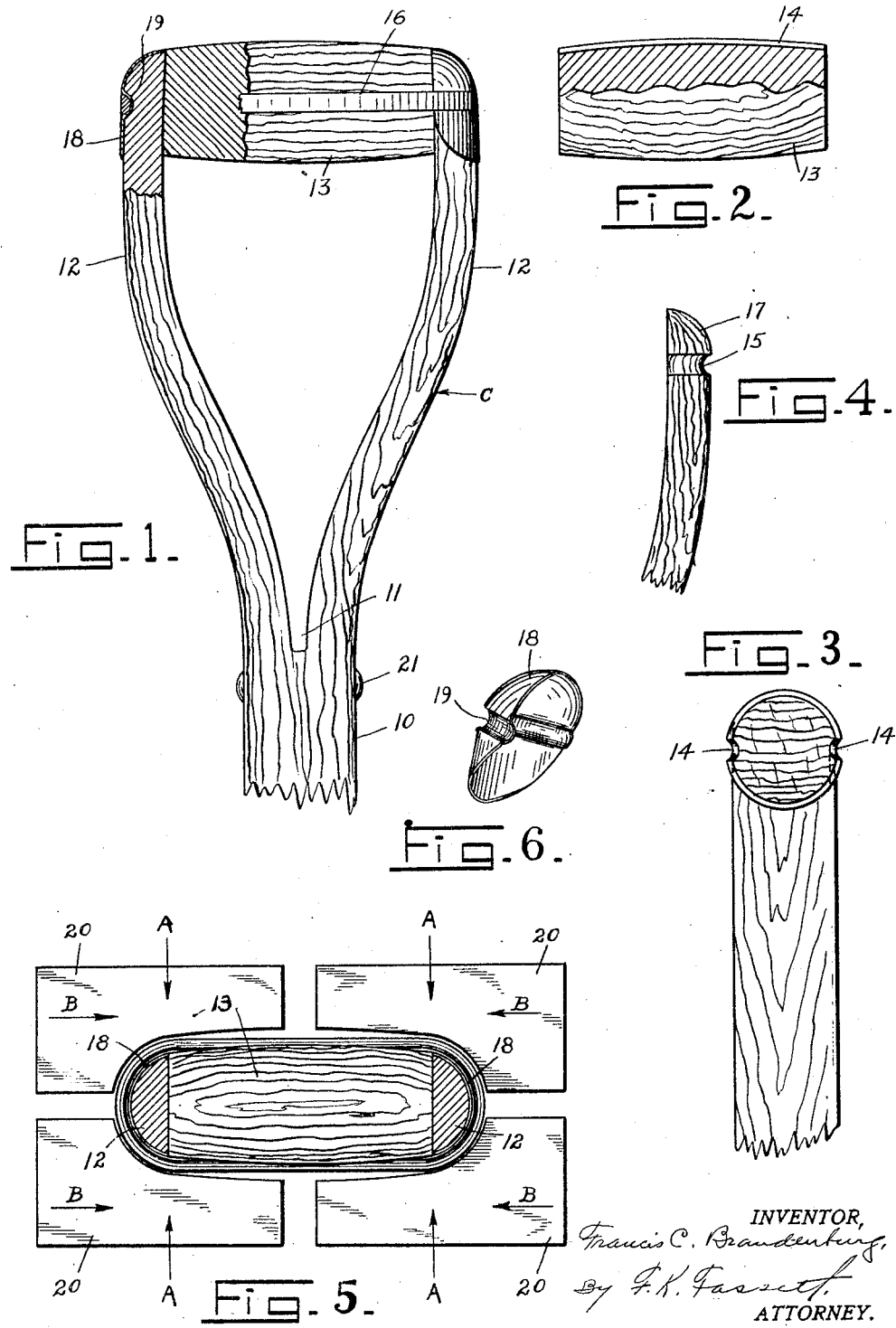
INVENTOR,
Francis C. Brandenburg,
By F. K. Fassett
ATTORNEY.

Patented Sept. 10, 1929.

1,727,333

UNITED STATES PATENT OFFICE.

FRANCIS C. BRANDENBURG, OF PIQUA, OHIO, ASSIGNOR TO THE WOOD SHOVEL AND TOOL COMPANY, OF PIQUA, OHIO, A CORPORATION OF OHIO.

SHOVEL HANDLE.

Application filed May 11, 1923. Serial No. 638,278.

My present invention relates to improvements in shovel handles of the type wherein the end of a round shaft is split and the semi-round members bent to form a fork, a grip then being secured between the tines of the fork.

There are at least two fundamental reasons why the use of handles of this type should constantly increase. First, less lumber is required in their production than in the making of the well known D handle, which is an important consideration, in view of the increasing scarcity of lumber suitable for shovel handles, and second, they are lighter than the D handles. While the use of these handles is increasing, the growth of their popularity has been retarded by certain structural weaknesses, the overcoming of which, to even a limited extent, has resulted in increasing the cost of the handles, and in some cases their weight. The principal object of my invention is to produce a handle of this kind possessing all of the desirable qualities inherent in the type, but with none of the weaknesses of those heretofore made. Another object is to accomplish this major purpose, while keeping the cost as low as, or lower than that of handles of this type heretofore produced.

Other objects and advantages will be seen, or particularly pointed out hereinafter, but I shall first describe my improved handle, referring to the accompanying drawing, wherein, Figure 1 is a view of the completed handle in its preferred form, a portion thereof being shown in section;

Figure 2 is a view, partly sectional, of the grip of the handle;

Figure 3 is a fragmental view showing an end view of the grip and behind it a portion of one of the tines of the fork;

Figure 4 is a fragmental view of one tine of the fork;

Figure 5 is a diagrammatic view of a bulldozing die used in contracting the metallic band by which the parts of the handle are tied together, and Figure 6 is a perspective view of one of the metal caps which cover the ends of the tines.

My improved handle comprises a round shaft 10, one end of which is slitted longitudinally to a point 11, the semi-round members 12 thus produced being bent to form a fork. Between these members, which I shall hereinafter refer to as the tines of the fork, I place a barrel-shaped grip 13, with the ends of the grip abutting the flat inner faces of the tines. On two opposite sides the grip is provided with longitudinal grooves 14, as in Figures 2 and 3, and each of the tines is provided with a groove 15, which, when the grip is in place between the tines, registers with the grooves 14 in the grip, thus forming a continuous groove or channel adapted to receive an endless metal band 16, whereby the parts are bound together. The ends of the tines are rounded, as at 17 in Figure 4, and before the band 16 is put in place a sheet metal cap 18 is put on the end of each of the tines of the fork. As shown in Figures 1 and 6 these caps have depressions 19 corresponding to the grooves 15 in the tines, which depressions lie in said grooves. The metal band 16 is endless, and it is necessary, therefore, to make this band considerably larger in circumference than it is in the finished handle, so as to permit its being slipped over the parts of the handle adjacent to the grooves. I shall now describe the method of contracting the band to make it hug the bottom of the grooves.

In Figure 5 I show the grip 13, together with fragments of the tines 12, set in a bulldozing die comprising four segmental members 20. The metal caps 18 are in place on the tines, and the band 16 is in position to be shrunk into the grooves. The first part of the bulldozing operation consists in moving the die members 20 in the direction of the arrows marked A A A A. Thus the band is pressed into the grooves in the grip, although the band has so far been contracted but little, if any. Holding the die members together, they are next pressed toward each other in the direction indicated by the arrows marked B B B B. As the longitudinal portions of the band are closely confined by the walls of the grooves 14 and the die members, this last operation upsets the metal of the band, causing the band to closely hug the bottom of the grooves. I prefer to press the die segments together with sufficient force to compress the wood of the tines, and even that of the grip, to some extent. As the wood is more resilient than the metal, it tends to expand as the die pressure is removed, which tendency is resisted by the band. Unless the wood has been compressed too much, so as to destroy its resiliency, it will always retain this tendency to expand the band. And thus the band confines the wood and holds the parts firmly together. I have shown no means for supporting or operating the die segments, because tools of this kind are well known and fully understood by those who are skilled in the art. Given the main characteristics of a die, and the movements its parts are expected to have, the tool designer would experience no difficutly in devising the required operating elements.

I have spoken of the grip as "barrel-shaped": referring to Figures 1, 2 and 3 it will be seen that the diameter of the grip is greatest at its center, the diameter gradually diminishing toward each end of the grip. While this barrel-like form is not essential, it is preferable. It is not only a more desirable form for a grip of a shovel handle than a plain cylinder, but it contributes somewhat to the maintenance of the tension whereby the band 16 binds the parts of the handle together. It also precludes the possibility of the band springing out of the grooves 14 when the shovel handle is subjected to rough usage, such, for example, as being used as a tamping bar. The shape of the die segments should conform to that of the grip, and if desired the segments may be brought together close enough in the A A A A movement to cause them to hug the grip. If this is done, the subsequent B B B B movement of the segments will cause the die to hug the grip and the band even closer because of the taper of the grip. Thus it is easy to impart lateral compression to the grip, which, if the grip be barrel-shaped, will contribute to the maintenance of tension on the band.

The metal caps 18 being more or less cup-shaped, and having been hardened considerably by being formed with dies out of flat pieces of sheet metal, they may be made of comparatively thin metal. For example, I have found that sheet metal of No. 21 or No. 22 gauge is very appropriate for this purpose. After the parts are assembled and the band 16 shrunk into place, the whole handle is finished on a sand belt, which smooths down the edges of the metal until they are approximately flush with the wood, and the handle then presents a very smooth, neat and attractive appearance. As is customary in handles of this type a rivet 21 is put through the shaft 10 just below the point 11, to prevent the shaft from splitting.

One of the difficulties heretofore encountered in handles of this type was that of preventing the grip from rotating with reference to the tines of the fork. As is perfectly obvious, this difficulty is entirely overcome in my improved handle. The band lying in the grooves 14 makes even the slightest movement of the grip, either rotary or otherwise impossible. I prefer to make the band of what is known as half round iron or steel, putting the flat side of the iron outward. The grooves in which the band lies are therefore also half round. One advantage of using the half round metal is the greater ease with which the depressions can be formed in the metal caps 18. Flat metal, or metal of some other shape, might also be used, however, as will be easily appreciated by those who are skilled in the art. While there are various metals that are suitable for the bands, I prefer to use a metal which may be upset with comparative ease. Swedish iron possesses this quality, and so does ordinary low carbon steel. The preferred way of making the bands is to bend strips of metal to the desired form and weld their ends together, thus making the band endless. Electrical butt-welding is a useful method of welding the ends.

It is customary in making handles of this type to taper the shaft from about the point 11 to its end. The purpose of this taper is to gradually reduce the width and thickness of the tines of the fork. In fact, many of the existing devices for securing the grip to the tines necessitate this reduction of the size of the tines at the point where they are attached to the grip. This practice of tapering the tines has been found objectionable, for the reason that it causes the fibers of the wood to terminate at various points along the outside of the tines, so that from a point indicated by the arrow head marked C in Figure 1, to the end of the tine the termini of the fibers tend to break out from the tines and form splinters along these outer surfaces. This tendency is aggravated, of course, by the fact of the wood being bent. This splintering of the tapering tines has been found so objectionable that in a number of cases inventors have designed metallic members to cover the affected portions of the tines, in order to protect the hands of the user from splinters. I prefer to make my shaft substantially cylindrical, at least from the point C, or even from the point 11, to its end, so that all of the fibers of the wood may run to the ends of the tines. Thus this splintering problem is solved. Furthermore making the width of the tine equal to the diameter of the end of the grip which abuts it, gives the handle a rugged yet graceful appearance, and on the whole my handle is very attractive.

While I have described the preferred embodiment of my invention, it is not to be supposed that the invention is limited in its application to the particular construction shown. On the contrary, various structural modifications are possible without departure from the broader aspects of my invention.

What I claim is as follows:

1. A shovel handle comprising a two-tined fork, a grip between the tines of the fork with one end abutting each tine, a groove along each side of the grip, extending from tine to tine, a groove around each tine registering with the grooves in the grip, thereby forming an endless groove lying in a plane parallel to the axis of the grip, and an endless metal band upset into said groove.

2. In a shovel handle comprising a two-tined fork, a grip between the tines of the fork with one end abutting each tine, metal caps on the tines, and a metal band surrounding the tines and grip in a plane parallel to the axis of the grip, said band being upset to contract it after it is in place on the handle, thereby imparting tension to the band and enabling it to bind the parts of the handle tightly together.

3. A shovel handle comprising a two-tined fork, a barrel-shaped grip between the tines of the fork with one end abutting each tine, a tension band whereby the grip and tines are bound together, said band lying against the sides of the grip and passing around the tines, the band being under tension, thereby constantly pressing the tines firmly against the ends of the grip, and means for preventing rotation of the grip with reference to the tines.

4. A shovel handle comprising a two-tined fork, a barrel-shaped grip between the tines of the fork with one end abutting each tine, and an endless metallic band whereby the grip and tines are bound together, said band lying against the sides of the grip and passing around the tines, the band being under tension and thereby enabled to constantly press the tines firmly against the ends of the grip.

5. A shovel handle comprising a two-tined fork, a barrel-shaped grip between the tines with one end abutting each tine, and an endless metallic band whereby the grip is secured to the tines, said band lying in grooves on each side of the grip and in grooves formed in the tines, and being in tension, thereby constantly holding the tines firmly against the ends of the grip, the outer surface of the band being flush with the surface of the grip.

6. A shovel handle comprising a two-tined fork, a grip between the tines with one end abutting each tine, metallic caps covering the end portions of the tines, and an endless metallic band which passes around the capped ends of the tines and the grip, binding them together, said band being in tension and thereby drawing the tines firmly against the grip.

7. A shovel handle comprising a two-tined fork, a grip between the tines with one end abutting each tine, said grip having a longitudinal groove cut in each side, and each tine having a groove whose ends register with the grooves in the grip, metallic caps covering the ends of the tines, said caps have groove-like depressions which enter the grooves in the tines, and an endless metallic band lying in the grooves in the grip and in said depressions in the caps, said band being in tension, thereby serving to bind the tines firmly to the grip.

8. A shovel handle comprising a two-tined fork, a grip between the tines with one end abutting each tine, said grip having a longitudinal groove cut in each side, and each tine having a groove whose ends register with the grooves in the grip, metallic caps covering the ends of the tines, said caps have groove-like depressions which enter the grooves in the tines, and an endless metallic band lying in the grooves in the grip and in said depressions in the caps, said band being in tension sufficient in degree to keep the material composing the tines and grip compressed, thereby binding the tines firmly to the grip.

9. A shovel handle comprising a round wooden shaft, one end of which is slitted and the semi-round members thus formed bent to form a fork; a grip inserted between the tines of the fork with one end abutting each tine, the ends of the tines being rounded to make them meet the grip gracefully, said grip having grooves cut in each side, while the tines have grooves registering with the grooves in the grip, sheet metal caps covering the rounded ends of the tines and having groove-like depressions to lie in the grooves in the tines, and a metal band lying in said grooves, holding the caps in place on the tines and securing the tines to the grip.

10. A shovel handle comprising a two-tined fork, a grip between the tines of the fork with one end abutting each tine, a tension band whereby the grip and tines are bound together, said band lying against the sides of the grip and passing around the tines, the band being under tension, thereby constantly pressing the tines firmly against the ends of the grip, and means for preventing rotation of the grip with reference to the tines.

11. A shovel handle, comprising a two-tined fork, a grip between the tines of the fork with one end abutting each tine, and an endless metallic band whereby the grip and tines are bound together, said band lying against the sides of the grip and passing around the tines, the band being under tension and thereby enabled to constantly press the tines firmly against the ends of the grip.

12. A shovel handle comprising a two-tined fork, a grip between the tines of said fork with one end abutting each tine, said grip having longitudinal grooves in opposite sides, each tine having grooves whose ends register with the grooves in the grip, thereby forming an endless groove in a plane substantially coincident with the axis of the grip, and a metallic band lying in said groove, said band being under tension imparted thereto by mechanical contraction of the metal after the band is in place in said groove.

FRANCIS C. BRANDENBURG.